US006931563B2

(12) United States Patent
Urita

(10) Patent No.: US 6,931,563 B2
(45) Date of Patent: Aug. 16, 2005

(54) CLOCK SUPPLY CONTROLLER SUPPLIES AN INDEPENDENT CLOCK CONTROL SIGNAL TO A PCMCIA CONTROLLER WHICH GENERATES AN INTERRUPT SIGNAL

(75) Inventor: Kenji Urita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 692 days.

(21) Appl. No.: 09/811,572

(22) Filed: Mar. 20, 2001

(65) Prior Publication Data

US 2002/0019953 A1 Feb. 14, 2002

(30) Foreign Application Priority Data

Aug. 1, 2000 (JP) ........................................ 2000-233482

(51) Int. Cl.[7] .............................. G06F 1/04; G06F 1/32
(52) U.S. Cl. ...................................... 713/600; 713/322
(58) Field of Search ................................. 713/300, 322, 713/324, 401, 600; 710/302, 304

(56) References Cited

U.S. PATENT DOCUMENTS

| 5,398,262 A | * | 3/1995 | Ahuja ........................ 375/356 |
| 5,428,790 A | * | 6/1995 | Harper et al. ............... 713/322 |
| 5,586,308 A | * | 12/1996 | Hawkins et al. ............ 713/501 |
| 5,600,839 A | * | 2/1997 | MacDonald ................ 713/322 |
| 5,625,807 A | * | 4/1997 | Lee et al. .................... 713/601 |
| 5,764,968 A | | 6/1998 | Ninomiya |
| 5,875,307 A | * | 2/1999 | Ma et al. .................... 710/304 |
| 5,881,271 A | * | 3/1999 | Williams .................... 713/401 |
| 5,903,747 A | * | 5/1999 | Casal ......................... 713/501 |
| 6,021,506 A | * | 2/2000 | Cho et al. ................... 713/601 |
| 6,055,372 A | * | 4/2000 | Kardach et al. ............ 710/261 |
| 6,079,022 A | * | 6/2000 | Young ........................ 713/300 |
| 6,141,711 A | * | 10/2000 | Shah et al. ................. 710/302 |
| 6,240,522 B1 | * | 5/2001 | Stufflebeam ............... 713/324 |
| 6,496,938 B1 | * | 12/2002 | Fry et al. .................... 713/322 |

FOREIGN PATENT DOCUMENTS

| JP | 9-62622 | 3/1997 |
| JP | 10-133766 | 5/1998 |
| JP | 11-53049 | 2/1999 |

* cited by examiner

Primary Examiner—Chun Cao
(74) Attorney, Agent, or Firm—Westerman, Hattori Daniels & Adrian, LLP

(57) ABSTRACT

In a clock supply control apparatus and method of the invention, a clock signal is generated, and supply of the generated clock signal from a clock supply logic unit to a second device of a computer system is controlled in response to a clock control signal, the second device being operable with the clock signal supplied from the clock supply logic unit. The clock control signal is set at one of a supply inhibition level and a supply allowance level in response to a state of a clock run signal line, the resulting clock control signal being supplied to the clock supply logic unit. A first device of the computer system is operable with the generated clock signal and outputs an interrupt signal to an interrupt signal line regardless of whether the clock control signal is set at the clock supply inhibition level or the clock supply allowance level.

10 Claims, 13 Drawing Sheets

CLOCK SUPPLY CONTROLLER SUPPLIES AN INDEPENDENT CLOCK CONTROL SIGNAL TO A PCMCIA CONTROLLER WHICH GENERATES AN INTERRUPT SIGNAL

BACKGROUND OF THE INVENTION

1. Field of the Invention

The present invention relates to a clock supply control apparatus and method that controls the supply of clocks to PCI devices of a computer system.

2. Description of the Related Art

Recently, there is the demand for saving the power consumption of computer systems. A computer system that is configured to have the clock run function in order to for the saving of the power consumption of PCI (peripheral component interconnect) devices is known.

The clock run function is aimed at saving the power consumption of PCI devices connected to a PCI bus within the computer system. A clock run signal line connects a power management controller and the PCI devices, and a clock run signal is delivered on the signal line to such PCI devices. When the clock run signal line is asserted, the supply of clocks to the PCI devices is allowed. When the clock run signal line is not asserted, the supply of clocks to the PCI devices is inhibited. At this time, the PCI devices stop operations in the absence of the clocks supplied, thereby achieving the power consumption saving.

Generally, a PCMCIA (Personal Computer Memory Card International Association) controller, which is provided as one of the PCI devices in a personal computer system, is configured to have an interrupt processing function in order to allow a known plug-and-play capability of a PC card. However, if the supply of a PCI bus clock to the PCMCIA controller is inhibited by performing the clock run function, the interrupt processing function of the PCMCIA controller is placed in the inactive condition because of the absence of the clock supplied thereto. Hence, there is a problem in that the PCMCIA controller in such a condition is unable to provide the plug-and-play capability of the PC card. To avoid the problem, in a conventional computer system in which the PCMCIA controller is installed, the clock run function is set in the inactive condition in order to allow the plug-and-play capability of the PC card. In the conventional computer system, the clock run function cannot suitably be used at the same time as the time the interrupt processing function of the PCMCIA controller is active.

It is desirable to provide a clock supply control mechanism that allows the PCMCIA controller to suitably use the clock run function to provide the saving of the consumption power when the interrupt processing function of the PCMCIA controller is active.

In order to facilitate understanding of the above problems, FIG. 1 is a diagram for explaining the clock run function which is performed in a personal computer system.

As shown in FIG. 1, a computer system 1 includes a bus controller 11 and a power management controller 12. A PCI bus 2 connects the bus controller 11 with a plurality of devices 5-1 through 5-$n$. A signal line 3 connects the power management controller 12 with the plurality of devices 5-1 through 5-$n$. The power management controller 12 is connected to an oscillator circuit 4. The oscillator circuit 4 generates a clock having a given frequency, and delivers the clock to each of the devices 5-1 through 5-$n$. The power management controller 12 controls the supply of the clock to the devices 5-1 through the 5-$n$.

In the computer system 1 of FIG. 1, the power management controller 12 provides the clock run function for the devices 5-1 through 5-$n$ connected to the signal line 3, as follows.

The power management controller 12 detects whether the signal line 3 on which a clock run signal is sent is asserted high. When the signal line 3 is active-high, the power management controller 12 controls the oscillator circuit 4 so that the supply of the clock from the oscillator circuit 4 to each of the devices 5-1 through 5-$n$ is inhibited. At this time, the devices 5-1 through 5-$n$ do not operate because of the absence of the clock supplied thereto, and they do not excessively consume the power. Namely, the clock run function, provided by the power management controller 12, is active for saving the power consumption of the devices 5-1 through 5-$n$.

When the signal line 3 is inactive or low, the power management controller 12 controls the oscillator circuit 4 so that the supply of the clock from the oscillator circuit 4 to each of the devices 5-1 through 5-$n$ is allowed. At this time, the devices 5-1 through 5-$n$ are normally operating in accordance with the clock supplied. Namely, the clock run function, provided by the power management controller 12, is inactive for saving the power consumption of the devices 5-1 through 5-$n$.

As described above, the PCMCIA controller as one of the PCI devices is configured to have an interrupt processing function in order to achieve a plug-and-play capability of a PC card. Specifically, in the PCMCIA controller, when the PC card is inserted into the computer, the insertion of the PC card causes the interrupt processing function of the PCMCIA controller to be performed to notify the computer of the presence of the inserted PC card. The computer recognizes the PC card through the interrupt processing function of the PCMCAI controller, and the plug-and-play capability of the PC card is thus achieved.

FIG. 2 is a diagram for explaining an interrupt processing process of the PCI devices in a computer system. In FIG. 2, the elements which are essentially the same as corresponding elements in FIG. 1 are designated by the same reference numerals, and a description thereof will be omitted.

As shown in FIG. 2, a plurality of interrupt (INT) signal lines 21-1 through 21-$n$ connect the plurality of the PCI devices 5-1 through 5-$n$ with the bus controller 11. The PCI bus 2 connects the bus controller 11 with the PCI devices 5-1 through 5-$n$.

In the computer system of FIG. 2, the bus controller 11 detects whether one of the INT signal lines 21-1 through 21-$n$ on which an interrupt signal is sent is asserted high. Hereinafter, one of the INT signal lines 21-1 through 21-$n$ is indicated by reference numeral "21-$i$". When the INT signal line 21-$i$ is active-high, the bus controller 11 determines that an interrupt request is issued from the PCI device connected to the INT signal line 21-$i$. Hereinafter, the PCI device connected to the INT signal line 21-$i$ is indicated by reference numeral "5-$i$". The bus controller 11 delivers the interrupt signal, issued from the PCI device 5-$i$, to the computer. The operating system of the computer temporarily stops what it is doing to divert its attention to the service required by the interrupt signal.

The configuration of the computer system shown in FIG. 2 requires the "n" interrupt signal lines 21-1 through 21-$n$, which will increase the number of wires and the number of input/output terminals, related to the bus controller 11, on the integrated circuit chip. With the configuration of FIG. 2 used, there is a difficulty in providing a small-size clock supply control apparatus.

FIG. 3 is a diagram for explaining a serialized interrupt processing process of the PCI devices in a computer system. In FIG. 3, the elements which are essentially the same as corresponding elements in FIG. 1 are designated by the same reference numerals, and a description thereof will be omitted.

In order to eliminate the problem of the configuration of FIG. 2, in the configuration of the computer system shown in FIG. 3, an interrupt signal line 32 is shared by a plurality of PCI devices 31-1 through 31-n, and a serialized interrupt processing process is performed in the computer system.

As shown in FIG. 3, the common interrupt signal line 32 connects the PCI devices 31-1 through 31-n with a bus controller 33. The PCI bus 2 connects the bus controller 33 with the PCI devices 31-1 through 31-n. A specific pattern of interrupt signals allocated for the PCI devices 31-1 through 31-n is predetermined. When an interrupt request is issued from one of the PCI devices 31-1 through 31-n, the specific pattern in which a corresponding interrupt signal sent from the PCI device 31-i is set is sent to the bus controller 33 on the interrupt signal line 32 at a given timing.

In the computer system of FIG. 3, the bus controller 33 receives the specific pattern, including the interrupt signal, from the interrupt signal line 32 at the given timing, and recognizes that the interrupt request is issued from a particular one of the PCI devices (or the PCI device 31-i) based on the received pattern. In this configuration, the PCI devices 31-1 through 31-n must generate the interrupt signals of the specific pattern in accordance with the PCI bus clock supplied thereto, and control the timing that they output the interrupt signals of the specific pattern to the interrupt signal line 32.

The configuration of the computer system shown in FIG. 3 requires that the PCI devices 31-1 through 31-n output the interrupt signals of the specific pattern to the interrupt signal line 32 at the given timing. To meet the requirement, the PCI devices 31-1 through 31-n must be operated in synchronism with the PCI bus clock supplied thereto.

However, in the configuration of FIG. 3, if the supply of the PCI bus clock to the PCI devices 31-1 through 31-n is inhibited by performing the clock run function, the interrupt processing function of the PCI devices 31-1 through 31-n is placed in the inactive condition because of the absence of the clock supplied thereto. Hence, there is a problem in that the PCMCIA controller in the inactive condition is unable to provide the plug-and-play capability of the PC card through the interrupt processing function. To avoid the problem, in the conventional computer system in which the PCMCIA controller is installed, the clock run function is set in the inactive condition in order to allow the plug-and-play capability of the PC card. In the conventional computer system, the clock run function cannot suitably be used at the same time as the time the interrupt processing function of the PCMCIA controller is active.

SUMMARY OF THE INVENTION

It is an object of the present invention to provide an improved clock supply control apparatus and method in which the above-described problems are eliminated.

Another object of the present invention is to provide a clock supply control apparatus that allows the computer system to effectively use the clock run function in order to provide the saving of the consumption power of the PCI devices, concurrently with the serialized interrupt processing function of the PCI devices being set in the active condition.

Another object of the present invention is to provide a clock supply control method that allows the computer system to effectively use the clock run function in order to provide the saving of the consumption power of the PCI devices, concurrently with the serialized interrupt processing function of the PCI devices being set in the active condition.

The above-mentioned objects of the present invention are achieved by a clock supply control apparatus which controls supply of a clock signal to first and second devices of a computer system, the clock supply control apparatus comprising: a clock generating unit which generates a clock signal; a clock supply logic unit which controls supply of the clock signal from the clock generating unit to the second device in response to a clock control signal, the second device being operable with the clock signal supplied from the clock supply logic unit; and a controller which sets the clock control signal at one of a clock supply inhibition level and a clock supply allowance level in response to a state of a clock run signal line, the resulting clock control signal being supplied from the controller to the clock supply logic unit, wherein the first device is operable in accordance with the clock signal from the clock generating unit and outputs an interrupt signal to an interrupt signal line.

The above-mentioned objects of the present invention are achieved by a clock supply control apparatus comprising: a clock generating unit which generates a clock signal; a clock supply logic unit which controls supply of the clock signal from the clock generating unit to a device of a computer system in response to a clock control signal, the device outputting an interrupt signal in response to an operational signal based on the clock signal from the clock supply logic unit; and a control unit which delays supply of the operational signal to the device such that the device outputs the interrupt signal in response to the delayed operational signal after the clock signal from the clock supply logic unit is received at the device.

The above-mentioned objects of the present invention are achieved by a clock supply control apparatus comprising: a clock generating unit which generates a clock signal; a clock supply logic unit which controls supply of the clock signal from the clock generating unit to a device of a computer system in response to a clock control signal, the device being operable with the clock signal supplied from the clock supply logic unit, the device outputting an interrupt signal in response to an operational signal based on the clock signal from the clock supply logic unit; and a controller which sets the clock control signal at one of a clock supply inhibition level and a clock supply allowance level in response to a state of a clock run signal line, the resulting clock control signal being supplied from the controller to the clock supply logic unit, wherein the controller detects whether the clock signal from the clock supply logic unit is received at the device, and the controller delays supply of the operational signal to the device such that the device outputs the interrupt signal in response to the delayed operational signal after it is detected that the clock signal from the clock supply logic unit is received at the device.

The above-mentioned objects of the present invention are achieved by a clock supply control method which controls supply of a clock signal to first and second devices of a computer system, the clock supply control method comprising the steps of: generating a clock signal; controlling supply of the generated clock signal from a clock supply logic unit to the second device in response to a clock control signal, the second device being operable with the clock signal supplied from the clock supply logic unit; and setting the clock control signal at one of a supply inhibition level and a supply allowance level in response to a state of a clock run signal line, the resulting clock control signal being supplied to the clock supply logic unit, wherein the first device is operable in accordance with the generated clock signal and outputs an interrupt signal to an interrupt signal line.

The above-mentioned objects of the present invention are achieved by a clock supply control method comprising the steps of: generating a clock signal; controlling supply of the clock signal to a device of a computer system by a clock supply logic unit in response to a clock control signal, the device outputting an interrupt signal in response to an operational signal based on the clock signal from the clock supply logic unit; and delaying supply of the operational signal to the device such that the device outputs the interrupt signal in response to the delayed operational signal after the clock signal from the clock supply logic unit is received at the device.

The above-mentioned objects of the present invention are achieved by a clock supply control method comprising the steps of: generating a clock signal; controlling supply of the clock signal to a device of a computer system by a clock supply logic unit in response to a clock control signal, the device being operable with the clock signal supplied from the clock supply logic unit, the device outputting an interrupt signal in response to an operational signal based on the clock signal from the clock supply logic unit; setting the clock control signal at one of a clock supply inhibition level and a clock supply allowance level in response to a state of a clock run signal line, the resulting clock control signal being supplied to the clock supply logic unit; detecting whether the clock signal from the clock supply logic unit is received at the device; and delaying supply of the operational signal to the device such that the device outputs the interrupt signal in response to the delayed operational signal after it is detected that the clock signal from the clock supply logic unit is received at the device.

According to the clock supply control apparatus and method of the present invention, it is possible that the computer system effectively use the clock run function in order to provide the consumption power saving, even when the serialized interrupt processing function of the PCI device, such as the PCMCIA controller, is active. The clock supply control apparatus and method of the present invention can ensure that the PCI device generates, in response to the delayed operational signal, the interrupt signal and outputs the interrupt signal to the interrupt signal line at a given timing based on the clock signal received at the PCI device. Further, the clock supply control apparatus and method of the present invention can ensure that the supply of the clock signal to the PCI device is controlled in response to the state of the operational signal, and the PCI device generates, in response to the delayed operational signal, the interrupt signal and outputs the interrupt signal to the interrupt signal line at a given timing based on the clock signal received at the PCI device.

BRIEF DESCRIPTION OF THE DRAWINGS

Other objects, features and advantages of the present invention will become apparent from the following detailed description when read in conjunction with the accompanying drawings.

DETAILED DESCRIPTION OF PREFERRED EMBODIMENTS

A description will now be provided of the preferred embodiments of the present invention with reference to the accompanying drawings.

Figure 4:
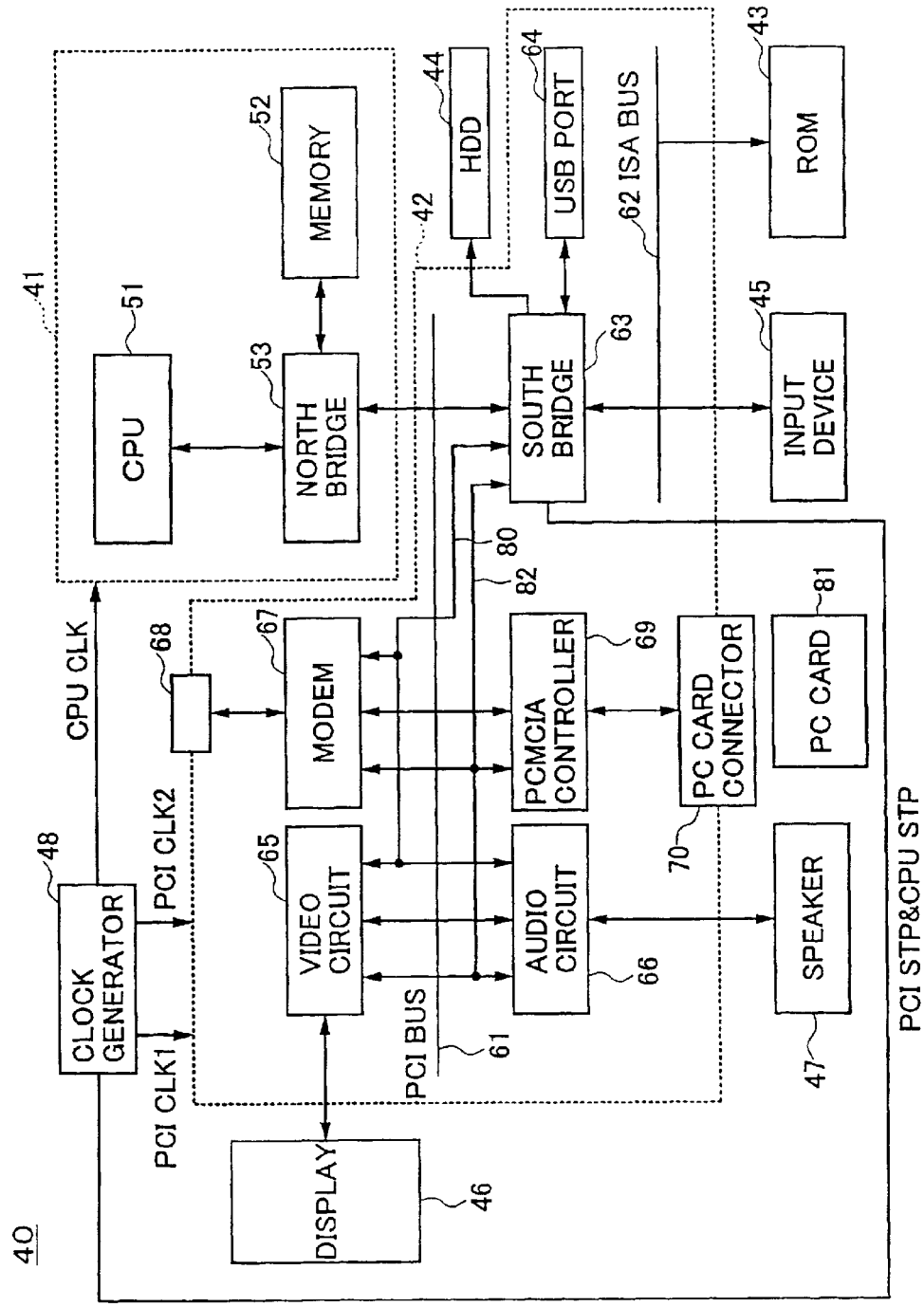
FIG. 4 is a block diagram of a computer system to which a first preferred embodiment of the clock supply control apparatus of the invention is applied.

FIG. 4 shows a configuration of a computer system to which a first preferred embodiment of the clock supply control apparatus of the invention is applied. The computer system of FIG. 4 is a computer system, such as a personal computer, in which the clock supply control apparatus of the invention is embodied.

As shown in FIG. 4, a computer system 40 generally includes a computation block 41, an interface block 42, a ROM (read-only memory) 43, a HDD (hard disk drive) 44, an input device 45, a display device 46, a speaker 47, and a clock generator 48.

The computation block 41 includes a CPU (central processing unit) 51, a memory device 52, and a north bridge 53. The computation block 41 carries out computation processing in accordance with program codes that are read from the HDD 44.

The memory 52 includes a RAM (random access memory) and temporarily stores data and programs. The memory 52 provides working storage areas for the CPU 51 when the computation processes are performed by the computation block 41.

The north bridge 53 provides interfacing connections between the CPU 51, the memory 52 and the interface block 42.

The interface block 42 includes a PCI (peripheral component interface) bus 61, an ISA (industry standard architecture) bus 62, a south bridge 63, a USB (universal serial bus) port 64, a video circuit 65, an audio circuit 66, a modem 67, a communication port 68, a PCMCIA controller 69, and a PC card connector 70.

The PCI bus 61 is a transmission path on which the north bridge 53, the south bridge 63, the video circuit 65, the audio circuit 66, the modem 67 and the PCMCIA controller 69 communicate with each other.

The ISA bus 62 is a transmission path on which the south bridge 53, the ROM 43 and the input device 45 communicate with each other.

The south bridge 63 provides interfacing connections between the PCI bus 61, the ISA bus 62, the HDD 44 and the USB port 64. Further, the south bridge 63 provides the power management function for the respective devices connected on the PCI bus 61.

Figure 5:
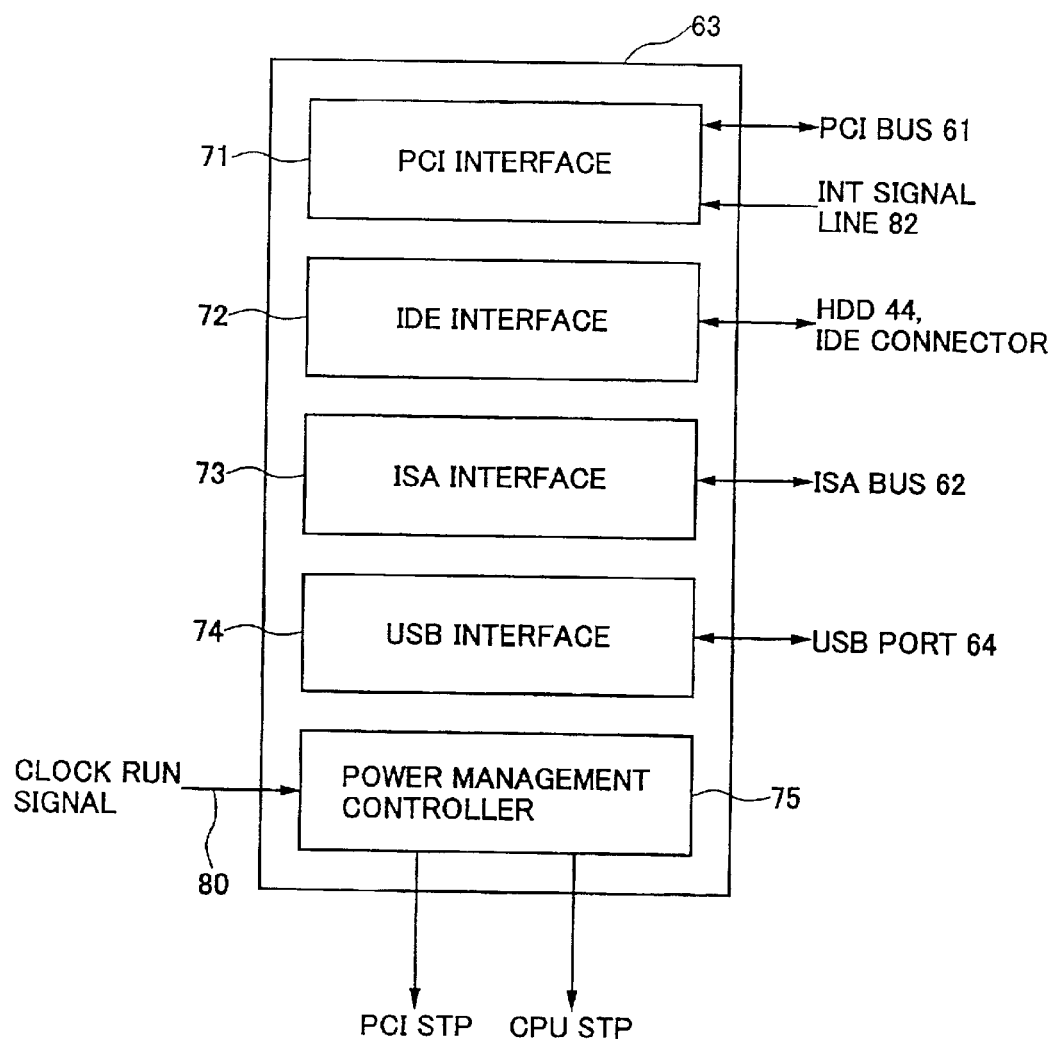
FIG. 5 is a functional block diagram of a south bridge in the computer system of FIG. 4.

FIG. 5 is a functional block diagram of the south bridge 63 in the computer system of FIG. 4.

As shown in FIG. 5, the south bridge 63 generally includes a PCI interface 71, an IDE (integrated drive electronics) interface 72, an ISA (industry standard architecture) interface 73, a USB (universal serial bus) interface 74, and a power management controller 75.

The PCI interface 71 provides connections between the PCI bus 61 and the elements of the south bridge 63. An interrupt signal line 82 connects the devices of the interface block 42 (including the video circuit 65, the audio circuit 66, the modem 67 and the PCMCIA controller 69) with the PCI interface 71. The IDE interface 72 provides connections between the HDD 44 and the elements of the south bridge 63 (the IDE connectors). The ISA interface 73 provides connections between the ISA bus 62 and the elements of the south bridge 63. The USB interface 74 provides connections between the USB port 64 and the elements of the south bridge 63.

Figure 1:
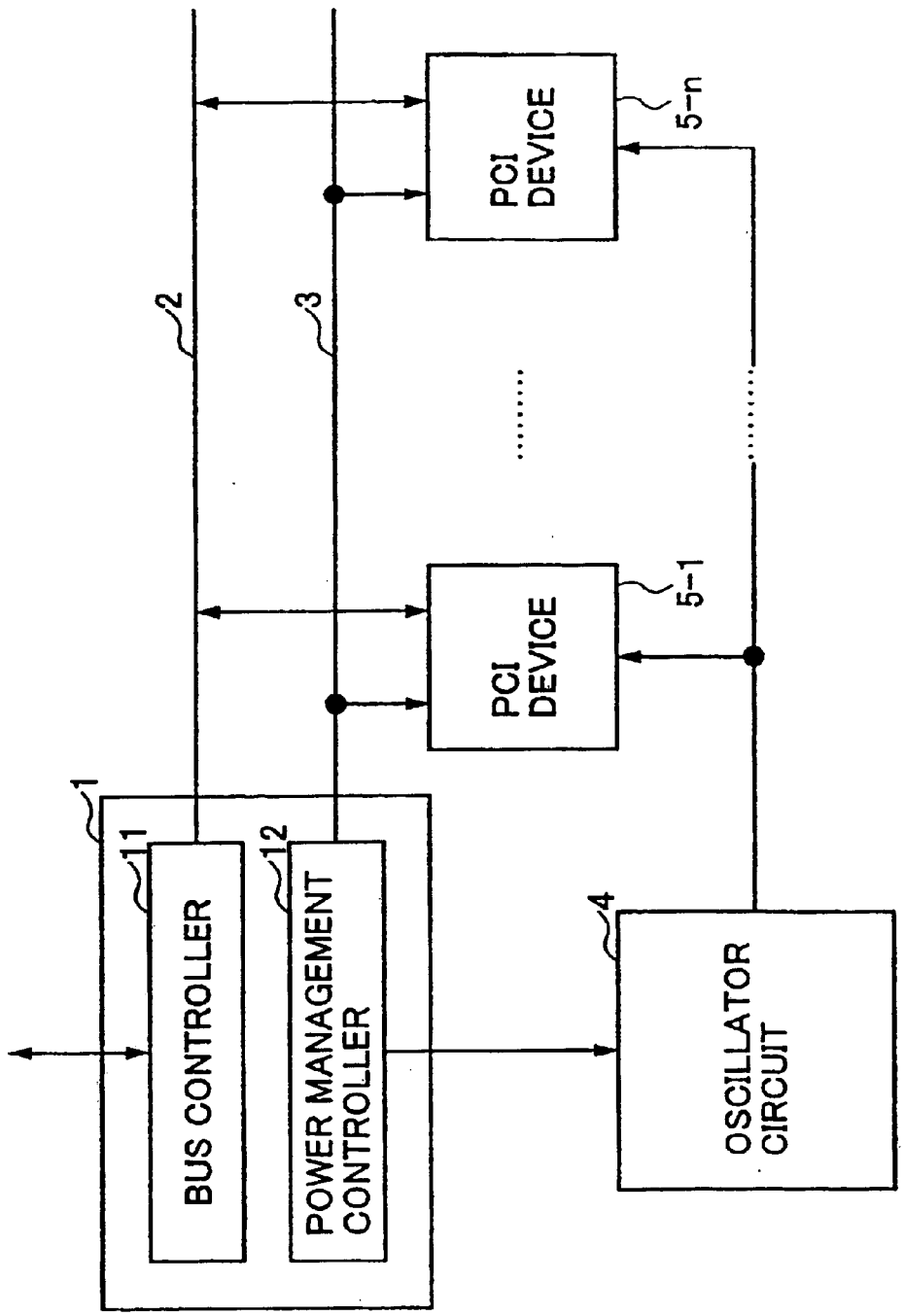
FIG. 1 is a diagram for explaining a clock run function which is performed in a personal computer system.
Figure 2:
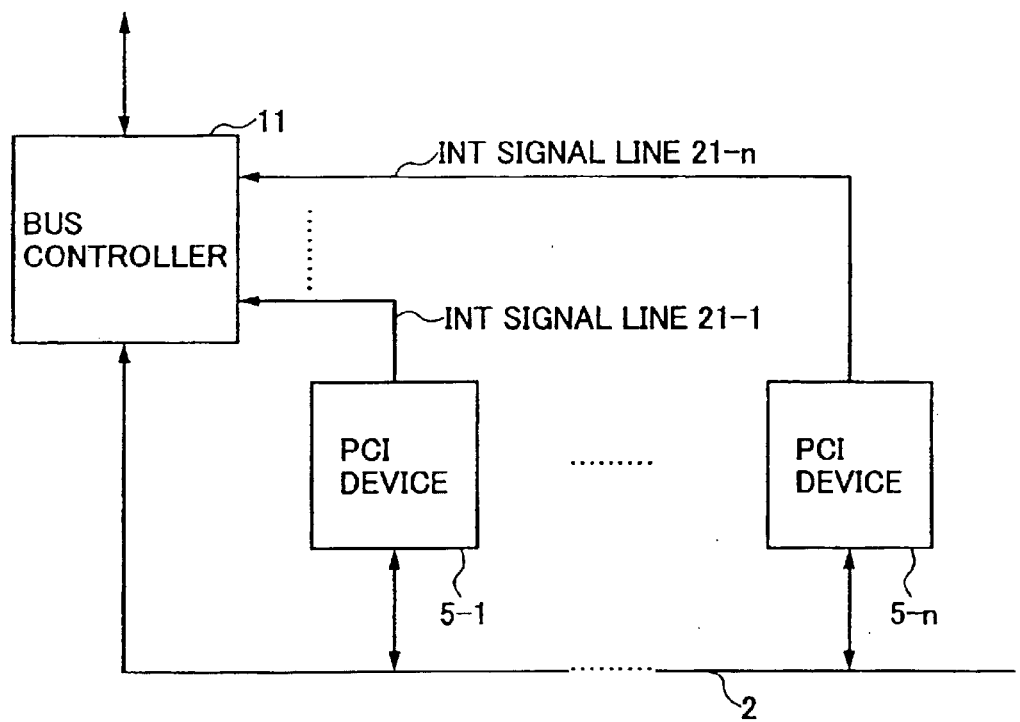
FIG. 2 is a diagram for explaining an interrupt processing process which is performed in the computer system.
Figure 3:
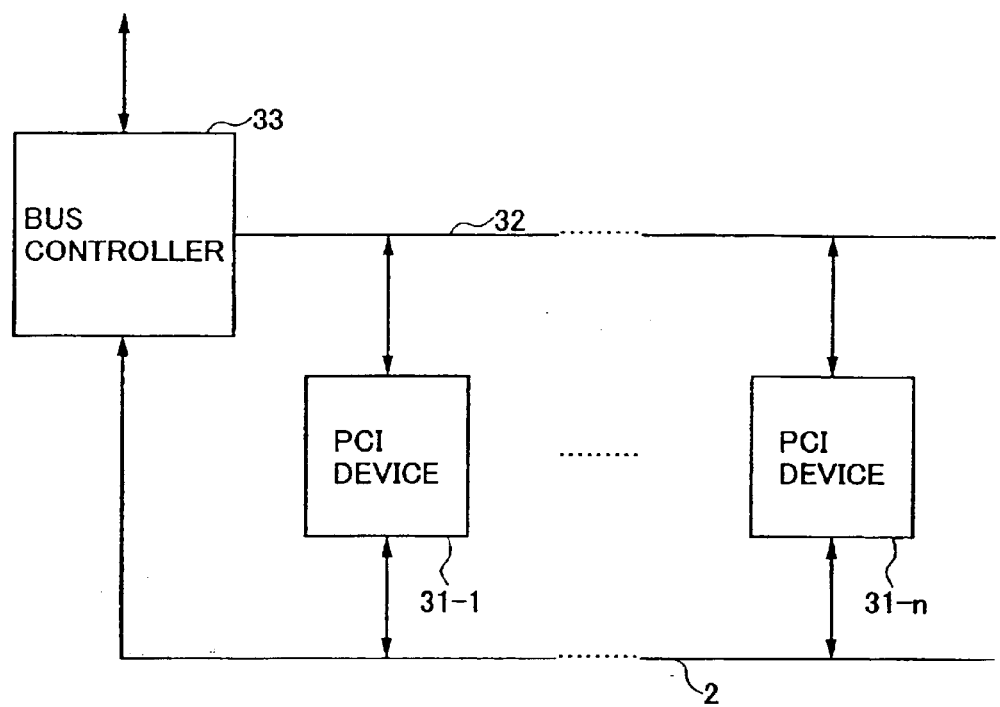
FIG. 3 is a diagram for explaining another interrupt processing process which is performed in the computer system.

In the computer system 40 of FIG. 4, the interrupt signal line 82 is shared by the devices 65, 66, 67 and 69 of the interface block 43, and a serialized interrupt processing process, which is similar to the serialized interrupt processing process of the configuration shown in FIG. 3 is performed by the computer system 40 of the present embodiment.

In the computer system 40 of FIG. 4, a clock run signal line 80 connects the devices of the interface block 42 (including the video circuit 65, the audio circuit 66 and the modem 67) with the power management controller 75 of the south bridge 63. The power management controller 75 provides the clock run function for the devices connected to the clock run signal line 80, which will be described below.

Figure 6:
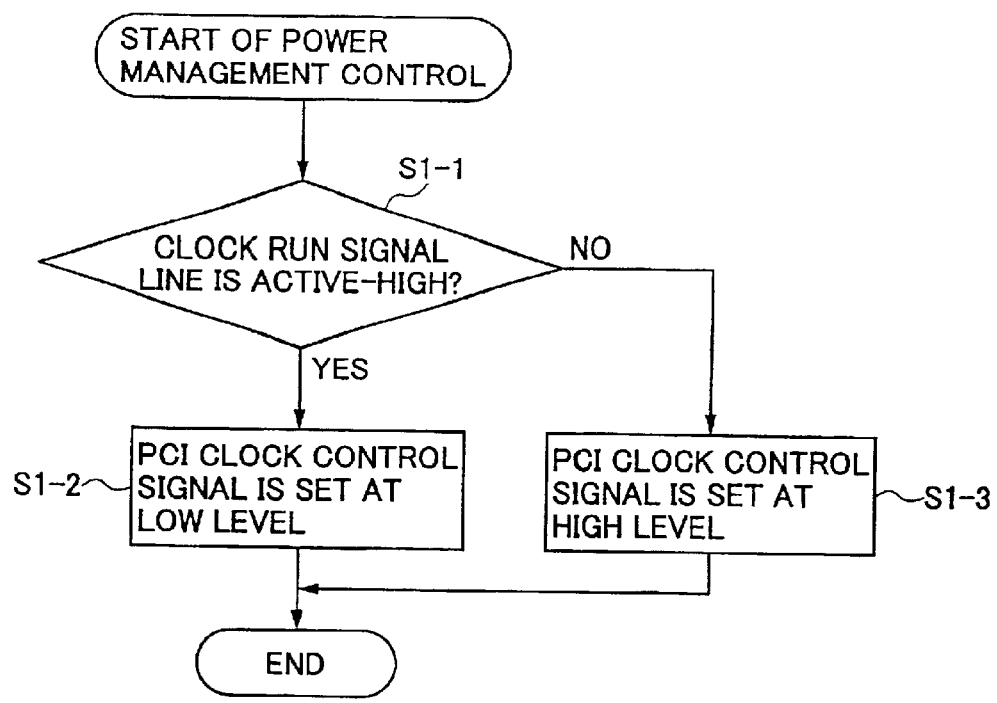
FIG. 6 is a flowchart for explaining a control process performed by a power management controller of the south bridge of FIG. 5.

FIG. 6 shows a power management control process that is performed by the power management controller 75 of the south bridge 63 of FIG. 5. Hereinafter, for the sake of simplicity of description, the power management controller 75 will be called the PMC 75.

As shown in FIG. 6, at a start of the control process, the PMC 75 at step S1-1 detects whether the clock run signal line 80 on which the clock run signal is sent is asserted high (or is active-high).

When the result at step S1-1 is affirmative (or when the signal line 80 is active-high), the PMC 75 at step S1-2 sets a PCI clock control signal (PCI STP) at low level. The PCI clock control signal is sent from the south bridge 63 to the clock generator 48, and when the PCI clock control signal is set at low level, the supply of a PCI clock signal (PCI CLK2) from the clock generator 48 to the devices of the interface block 42 (including the video circuit 65, the audio circuit 66 and the modem 67) is inhibited. Namely, the clock run function is negated at this time, and it contributes to the saving of the power consumption of the devices 65, 66 and 67.

When the result at step S1-1 is negative (or when the signal line 80 is inactive or low), the PMC 75 at step S1-3 sets the PCI clock control signal (PCI STP) at high level. When the PCI clock control signal (PCI STP) is set at high level, the supply of the PCI clock signal (PCI CLK2) from the clock generator 48 to the devices of the interface block 42 (including the video circuit 65, the audio circuit 66 and the modem 67) is allowed. The devices 65 through 67 of the interface block 42 are operating in accordance with the PCI clock signal (PCI CLK2) received.

In the computer system of FIG. 4, the clock generator 48 always supplies a PCI clock signal (PCI CLK1) to each of the south bridge 63 and the PCMCIA controller 69, regardless of whether the PCI clock control signal (PCI STP) is set at high level or low level.

Further, in the computer system of FIG. 4, the USB port 64 allows the software to connect directly to a USB-conformed peripheral device, such as a keyboard, a mouse, a monitor or a printer without encountering resource conflicts. The video circuit 65 provides video processing functions for video data received through the PCI bus 61 and displays the processed video data on the display device 46 in a visible form. The audio circuit 66 provides audio processing functions for audio data received through the PCI bus 61 and allows the speaker 47 to output an audible sound. The modem 67 connects the computer system 40 to a telephone line connected at the communication port 68 and provides communications between the system 40 and an external system over the telephone network. The PCMCIA controller 69 controls communications with a PC card 81 attached to the PC card connector 70.

Figure 7:
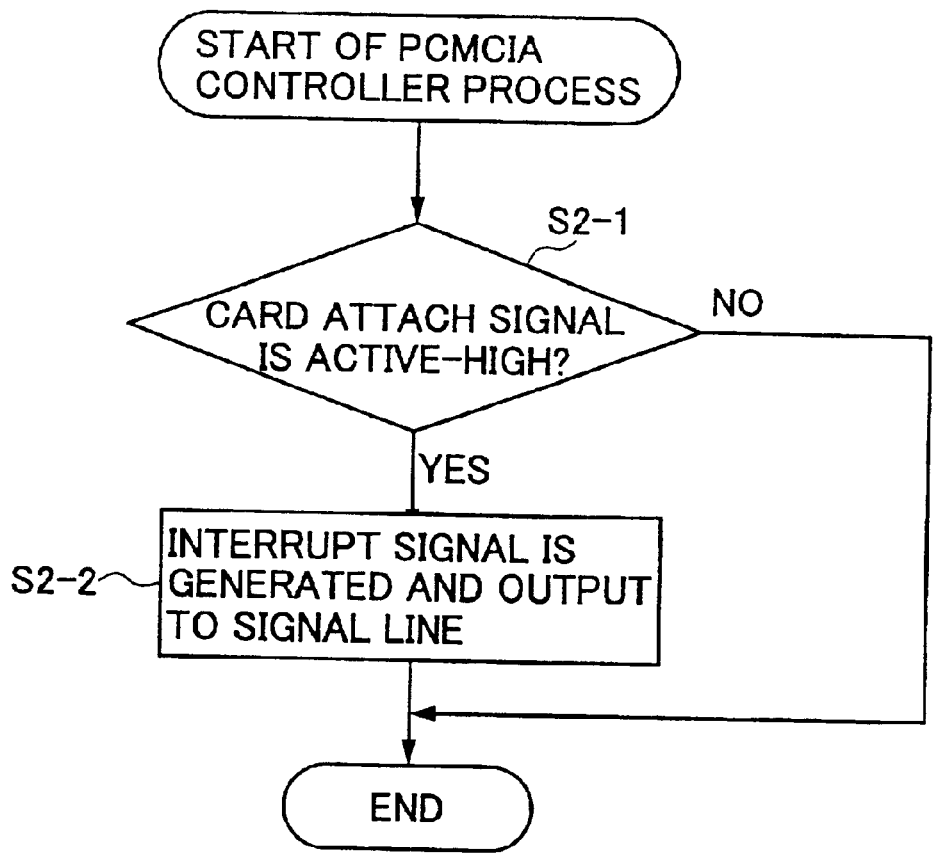
FIG. 7 is a flowchart for explaining an interrupt signal output process performed by a PCMCIA controller of the computer system of FIG. 4.

FIG. 7 shows an interrupt signal output process that is performed by the PCMCIA controller 69 of the computer system of FIG. 4. Hereinafter, for the sake of simplicity of description, the PCMCIA controller 69 will be called the controller 69.

As shown in FIG. 7, at a start of the interrupt signal output process, the controller 69 at step S2-1 detects whether a card attach signal is asserted high (or active-high) by the PC card connector 70. The card attach signal is an operational signal related to the PC card connector 70 and the PC card 81. The card attach signal is set at high level when the PC card 81 is attached to the PC card connector 70, and, when the PC card 81 is detached from the PC card connector 70, the card attach signal is set at low level. The card attach signal is sent from the PC card connector 70 to the controller 69.

When the result at step S2-1 is affirmative (or when the card attach signal is active-high), it is detected that the PC card 81 is attached to the PC card connector 70. The controller 69 at step S2-2 generates an interrupt signal and outputs the interrupt signal to the interrupt signal line 82 at a given timing. The controller 69 can produce an interrupt signal of a specific pattern and output the same to the interrupt signal line 82 based on the PCI clock signal (PCI CLK1) from the clock generator 48. After the step S2-2 is performed, the process of FIG. 7 is finished.

On the other hand, when the result at step S2-1 is negative (or when the card attach signal is inactive or low), it is detected that the PC card 81 is detached from the PC card connector 70. At this time, the process of FIG. 7 is finished without performing step S2-2.

In the computer system 40 of FIG. 4, the south bridge 63 performs, when it receives the interrupt signal of the specific pattern (which is supplied by the PCMCIA controller 69) from the interrupt signal line 82, the interrupt processing process.

The ROM 43 is a non-volatile memory that stores the basic input/output system (BIOS). The BIOS is a collection of software codes built into the computer system that handle some of the fundamental tasks of sending data from one part of the computer system to another when the CPU 51 accesses the external devices or memories.

The HDD 44 stores the operating system (OS), the application programs and data. The input device 45 includes the keyboard and the mouse, and it is provided to input data or commands to the computer system.

The display device 46 is constituted by a cathode-ray-tube (CRT) display, a liquid-crystal-device (LCD) display or the like. The display device 46 displays data and processing results in a visible form. The speaker 47 outputs an audible sound.

Further, in the computer system 40 of FIG. 4, the clock generator 48 generates the CPU clock signal (CPU CLK) and the PCI clock signal (PCI CLK1 or PCI CLK2). The CPU clock signal (CPU CLK) from the clock generator 48 has a frequency of about 100 MHz, and it is supplied to the computation block 41. The PCI clock signal (PCI CLK1) from the clock generator 48 has a frequency of about 33 MHz, and it is always supplied to each of the south bridge 63 and the PCMCIA controller 69. The PCI clock signal (PCI CLK2) from the clock generator 48 has a frequency of about 33 MHz, and it is supplied to each of the video circuit 65, the audio circuit 66 and the modem 67.

Further, in the computer system 40 of FIG. 4, the interface block 42 supplies both the CPU clock control signal (CPU STP) and the PCI clock control signal (PCI STP) to the clock generator 48. The supply of the CPU clock signal (CPU CLK) from the clock generator 48 to the computation block 42 is inhibited or allowed at the clock generator 68 in response to the CPU clock control signal (CPU STP). The supply of the PCI clock signal (PCI CLK2) from the clock generator 48 to the devices 65–67 is inhibited or allowed at the clock generator 68 in response to the PCI clock control signal (PCI STP).

Figure 8:
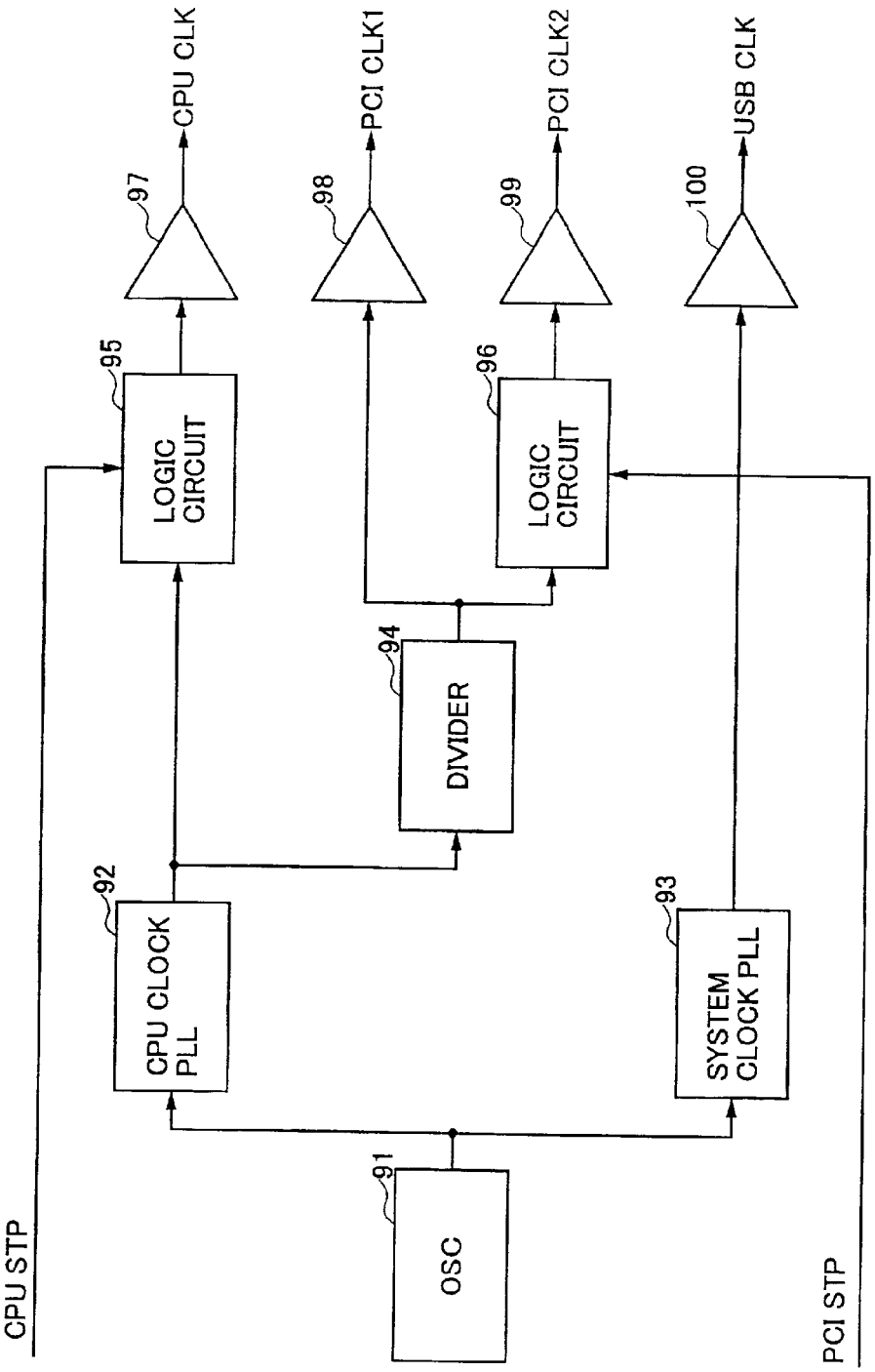
FIG. 8 is a block diagram of a clock generator of the computer system of FIG. 4.

FIG. 8 shows a configuration of the clock generator 48 of the computer system of FIG. 4.

As shown in FIG. 8, the clock generator 48 generally includes an oscillator circuit 91, a CPU clock PLL (phase-locked loop) circuit 92, a system clock PLL circuit 93, a frequency divider 94, a CPU clock supply logic circuit 95, a PCI clock supply logic circuit 96, and buffer amplifiers 97, 98, 99 and 100.

In the clock generator 48 of FIG. 8, the oscillator circuit 91 generates a source clock signal that oscillates at a predetermined frequency. The source clock signal, generated by the oscillator circuit 91, is supplied to each of the CPU clock PLL circuit 92 and the system clock PLL circuit 93.

The CPU clock PLL circuit 92 converts the frequency of the source clock signal into the frequency of the CPU clock signal (CPU CLK). The frequency of the CPU clock signal (CPU CLK) output by the CPU clock PLL circuit 92 is, for example, 100 MHz. The system clock PLL circuit 93 converts the frequency of the source clock signal into the frequency of the system clock signal (USB CLK). The frequency of the system clock signal (USB CLK) output by the system clock PLL circuit 93 is, for example, 48 MHz.

The CPU clock signal is supplied from the CPU clock PLL circuit 92 to each of the logic circuit 95 and the divider 94. The divider 94 converts the frequency of the CPU clock signal into the frequency of the PCI clock signal (PCI CLK1 or PCI CLK2) by division. The logic circuit 95 controls the supply of the CPU clock signal (CPU CLK) through the buffer amplifier 97 to the computation block 42 in response to the CPU clock control signal (CPU STP) received from the power management controller 75 of the south bridge 63. Specifically, when the CPU clock control signal (CPU STP) is active-high, the logic circuit 95 inhibits the supply of the CPU clock signal. When the CPU clock control signal (CPU STP) is inactive or low, the logic circuit 95 allows the supply of the CPU clock signal.

The buffer amplifier 97 amplifies the CPU clock signal (CPU CLK) received from the logic circuit 95, and delivers the amplified clock signal to the computation block 42.

The PCI clock signal is supplied from the divider 94 to each of the buffer amplifier 98 and the logic circuit 96. The buffer amplifier 98 amplifies the PCI clock signal (PCI CLK1) received from the divider 94, and delivers the amplified clock signal to each of the south bridge 63 and the PCMCIA controller 69.

The logic circuit 96 controls the supply of the PCI clock signal (PCI CLK2) through the buffer amplifier 99 to the devices 65 through 67 of the interface block 43 in response to the PCI clock control signal (PCI STP) received from the power management controller 75 of the south bridge 63. Specifically, when the PCI clock control signal (PCI STP) is active-high, the logic circuit 96 inhibits the supply of the PCI clock signal (PCI CLK2). When the PCI clock control signal (PCI STP) is inactive or low, the logic circuit 96 allows the supply of the PCI clock signal (PCI CLK2).

The buffer amplifier 99 amplifies the PCI clock signal (PCI CLK2) received from the logic circuit 96, and delivers the amplified clock signal to the devices 65 through 67 of the interface block 43.

The system clock signal is supplied from the system clock PLL circuit 93 to the buffer amplifier 100. The buffer amplifier 100 amplifies the system clock signal (USB CLK) received from the PLL circuit 93, and delivers the amplified clock signal to the USB interface 74 of the south bridge 63.

As described above, in the present embodiment, the clock generator 48 always supplies the PCI clock signal (PCI CLK1) to each of the south bridge 63 and the PCMCIA controller 69, regardless of whether the PCI clock control signal (PCI STP) is active-high or not. The clock generator 48 inhibits or allows the supply of the CPU clock signal (CPU CLK) to the computation block 41 in response to the CPU clock control signal (CPU STP). The clock generator 48 inhibits or allows the supply of the PCI clock signal (PCI CLK2) to the devices 65 through 67 of the interface block 43 in response to the PCI clock control signal (PCI STP).

In the present embodiment, the clock run function of the computer system 40 is achieved through the control process (FIG. 6) of the power management controller 75 of the south bridge 63. When the clock run signal line 80 is active-high, the power management controller 75 sets the PCI clock control signal (PCI STP) at high level, and, at this time, the clock run function contributes to the saving of the power consumption of the devices 65, 66 and 67. When the clock run signal line 80 is inactive or low, the controller 75 sets the PCI clock control signal (PCI STP) at low level.

In the present embodiment, the clock generator 48 always supplies the PCI clock signal (PCI CLK1) to the PCMCIA controller 69. Even when the PC card 81 is attached to the PC card connector 70 during the active condition of the clock run function, the PCI clock signal (PCI CLK1) is constantly supplied to the PCMCIA controller 69. Upon detection of the active-high card attach signal, the PCMCIA controller 69 generates the interrupt signal of the specific pattern and outputs it to the interrupt signal line 82 in accordance with the PCI clock signal (PCI CLK1).

Therefore, it is possible that the computer system 40 of the present embodiment effectively use the clock run function in order to provide the consumption power saving for the devices 65, 66 and 67 of the interface block 42 even when the serialized interrupt processing function of the PCMCIA controller 69 is active.

In the above-described embodiment, the clock generator 48 constantly supplies the PCI clock signal (PCI CLK1) to the PCMCIA controller 69, which is not associated with the clock run function. Hence, the computer system of the above-described embodiment can achieve both the clock run function and the serialized interrupt processing function at the same time. Alternatively, in order to attain the objects and advantageous features of the present invention, the computer system may be configured to incorporate a mechanism that constantly supplies the PCI clock signal to the PCMCIA controller 69, which will be described below.

Figure 9:
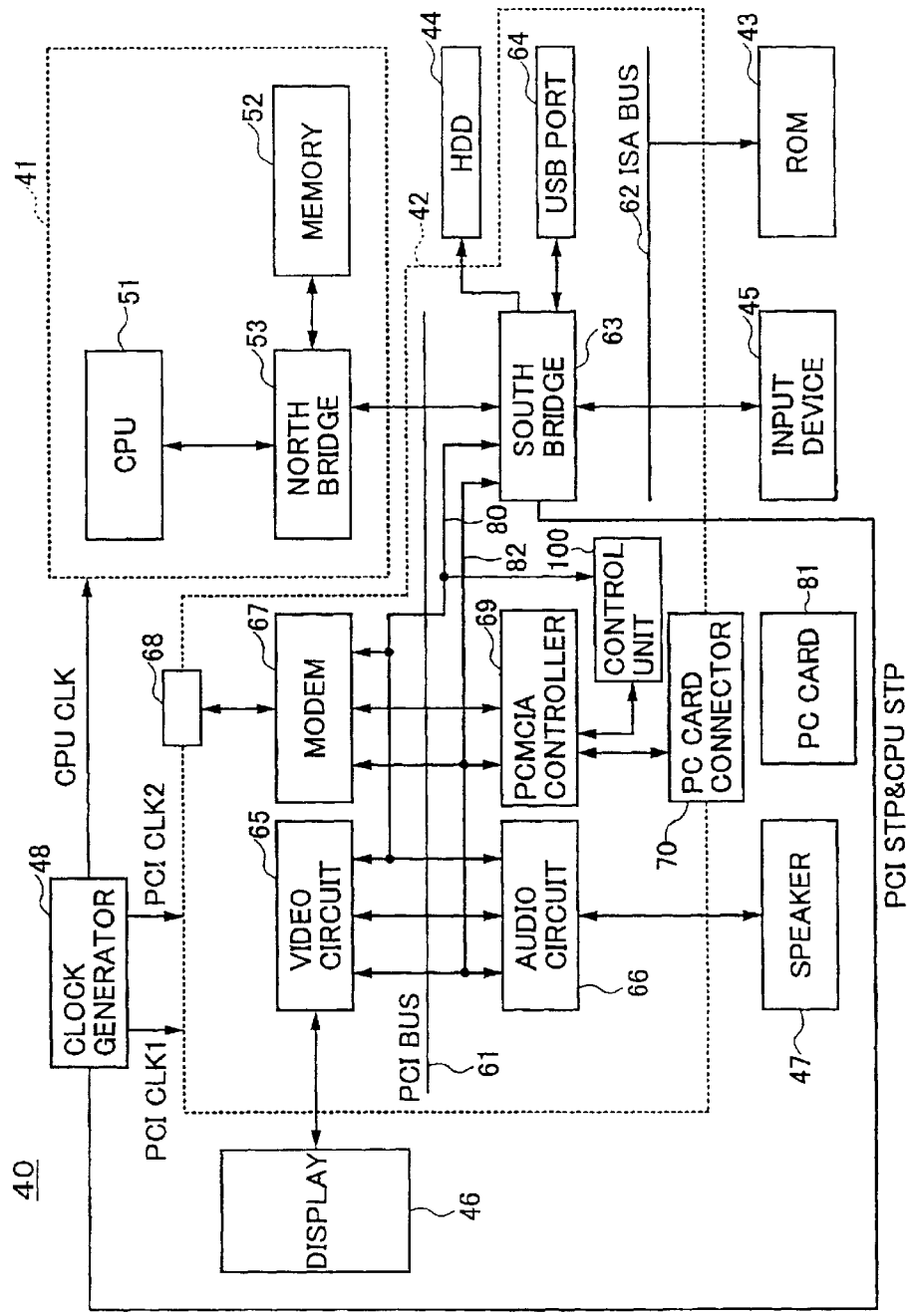
FIG. 9 is a block diagram of a computer system to which a second preferred embodiment of the clock supply control apparatus of the invention is applied.
Figure 10:
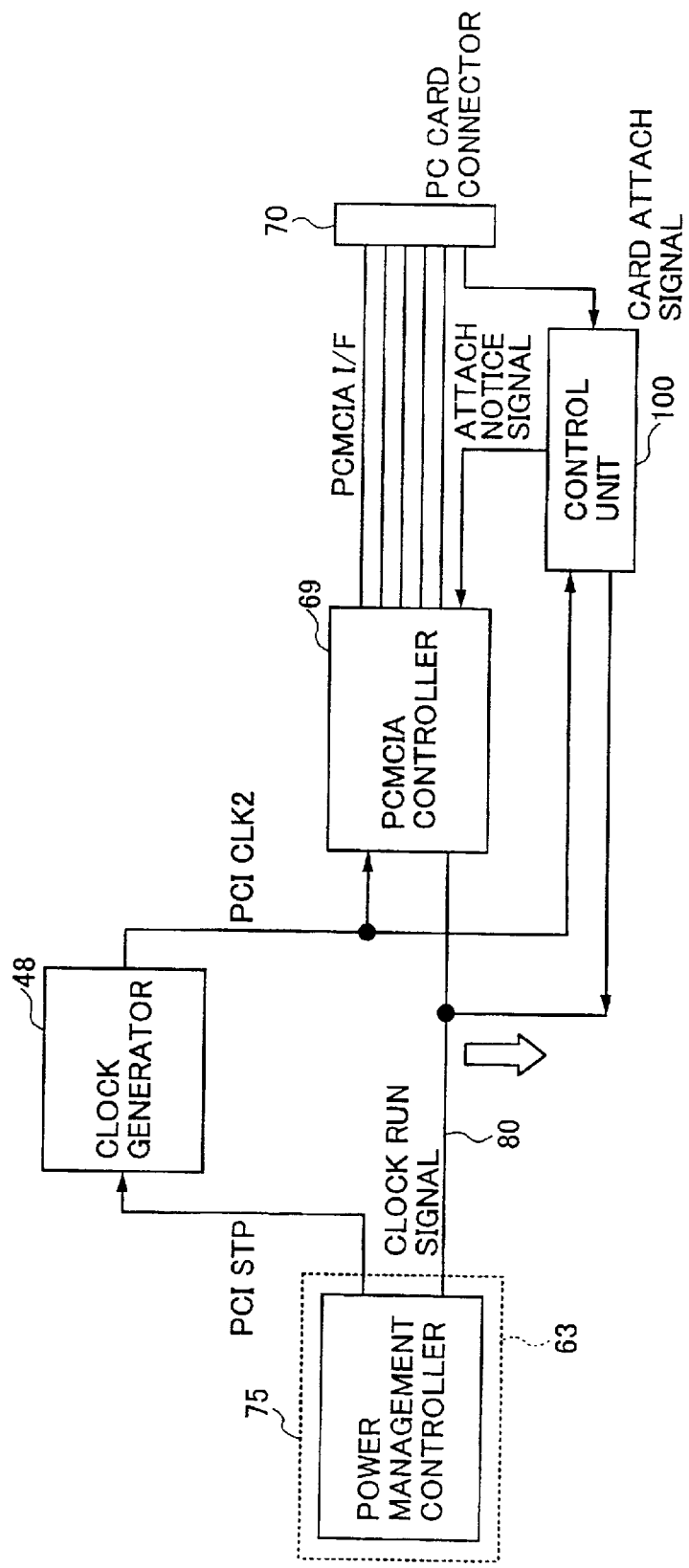
FIG. 10 is a block diagram of an essential portion of the computer system of FIG. 9.

FIG. 9 shows a computer system to which a second preferred embodiment of the clock supply control apparatus of the invention is applied. FIG. 10 shows an essential portion of the computer system of FIG. 9.

In FIG. 9 and FIG. 10, the elements which are essentially the same as corresponding elements in FIG. 4 are designated by the same reference numerals, and a description thereof will be omitted.

The computer system of the present embodiment is configured to incorporate the mechanism that constantly supplies the PCI clock signal to the PCMCIA controller 69. Specifically, the computer system of the present embodiment is essentially the same as the computer system 40 of FIG. 4 except that the PCI clock signal (PCI CLK2) from the clock generator 48 is supplied to the PCMCIA controller 69 and a control unit 100. Namely, the clock generator 48 generates the CPU clock signal (CPU CLK) and the PCI clock signal (PCI CLK1 or PCI CLK2). The CPU clock signal (CPU CLK) from the clock generator 48 is supplied to the computation block 41. The PCI clock signal (PCI CLK1) from the clock generator 48 is supplied to the south bridge 63. The PCI clock signal (PCI CLK2) from the clock generator 48 is supplied to each of the video circuit 65, the audio circuit 66, the modem 67, the PCMCIA controller 69, and the control unit 100 within the interface block 42.

As shown in FIG. 9 and FIG. 10, the card attach signal from the PC card connector 70 is supplied to the control unit 100. The PCI clock signal (PCI CLK2) from the clock generator 48 is supplied to both the PCMCIA controller 69 and the control unit 100. The clock run signal line 80 connects the devices of the interface block 42 (including the video circuit 65, the audio circuit 66 and the modem 67) with the power management controller 75 of the south bridge 63, and further connects the control unit 100 with the power management controller 75. In the present embodiment, the control unit 100 controls both the PCMCIA controller 69 and the clock run signal line 80 in response to the card attach signal received from the PC card connector 70, thereby the computer system of the present embodiment achieving both the clock run function and the serialized interrupt processing function at the same time.

Figure 11:
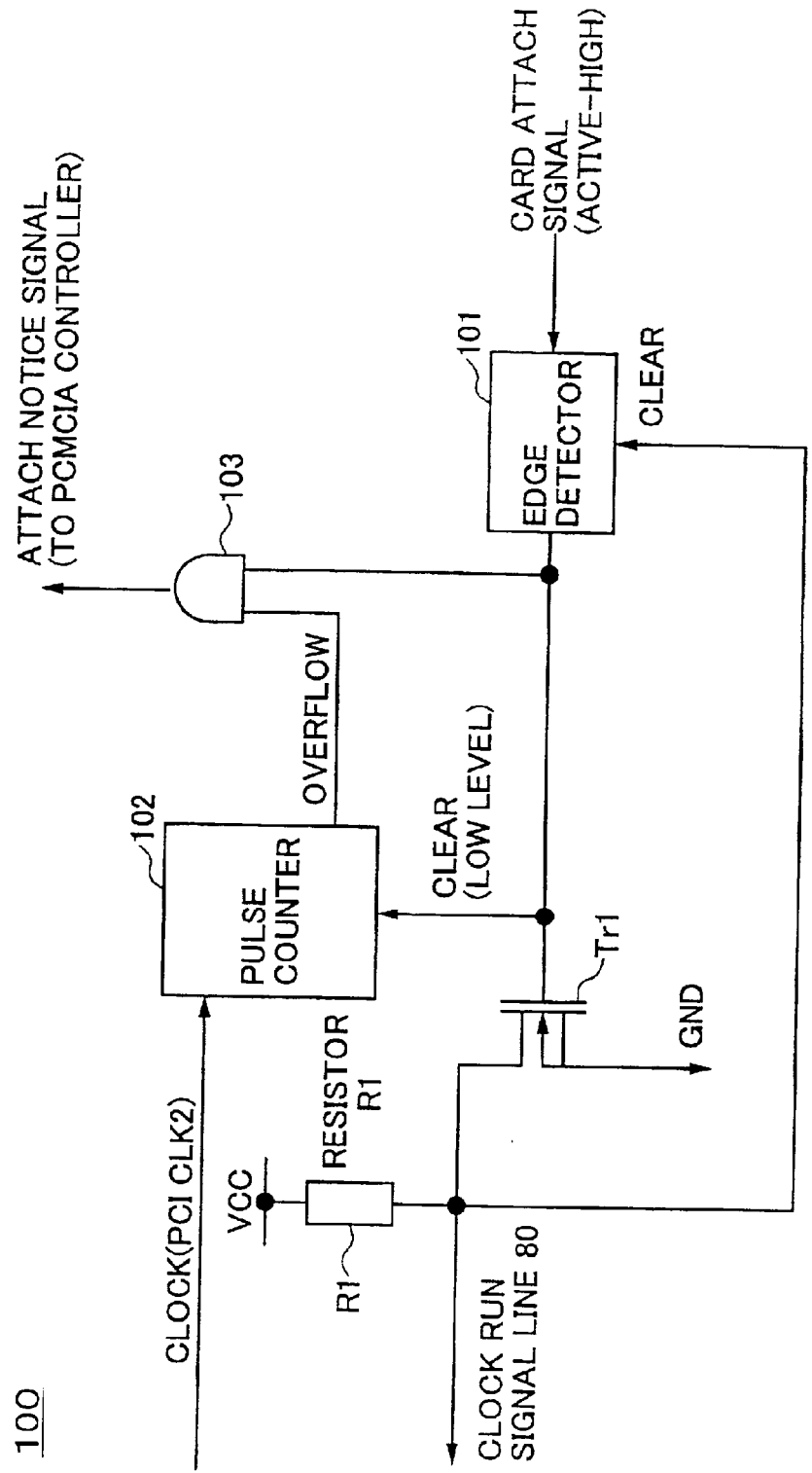
FIG. 11 is a block diagram of a control unit of the computer system of FIG. 9.

FIG. 11 shows a configuration of the control unit 100 of the computer system of FIG. 9.

As shown in FIG. 11, the control unit 100 generally includes an edge detector 101, a pulse counter 102, a transistor Tr1, an AND gate 103, and a resistor R1. The card attach signal from the PC card connector 70 is supplied to the edge detector 101. The edge detector 101 detects whether the card attach signal is active-high. When it is detected that the card attach signal is active-high, the edge detector 101 outputs a high-level control signal to each of the pulse counter 102, the AND gate 103 and the transistor Tr1. Further, when the clock run signal line 80 is active-high, the inputting of the clock run signal causes the edge detector 101 to be cleared.

The transistor Tr1 in the present embodiment is a field-effect transistor (FET) that has a drain connected to the clock run signal lines 80, a source grounded and a gate connected to the output of the edge detector 101. When the control signal output by the edge detector 101 is set at high level, the transistor Tr1 is switched ON. When the control signal output by the edge detector 101 is set at low level, the transistor Tr1 is switched OFF.

The PCI clock signal (PCI CLK2) from of the logic circuit 96 of the clock generator 48 is supplied to the pulse counter 102. The pulse counter 102 performs counting of the PCI clock signal (PCI CLK2) received from the clock generator 48, and outputs an overflow signal to the AND gate 103 as a result of the clock counting. When the control signal output by the edge detector 101 is set at low level, the inputting of the control signal causes the pulse counter 102 to be cleared.

The AND gate 103 has a first input connected to the output of the edge detector 101, a second input connected to the output of the pulse counter 102, and an output connected to the PCMCIA controller 69. When the overflow signal output from the pulse counter 102 is set at high level and the control signal output from the edge detector 101 is set at high level, the AND gate 103 outputs a high-level attach notice signal to the PCMCIA controller 69. Otherwise the notice signal, supplied from the AND gate 103 to the PCMCIA controller 69, is set at low level.

A description will be given of operation of the computer system 40 including the control unit 100 in the present embodiment.

When the PC card 81 is attached to the PC card connector 70, the card attach signal sent to the edge detector 101 is active-high. The edge detector 101 detects that the card attach signal is active-high, and outputs the high-level control signal to each of the pulse counter 102, the AND gate 103 and the transistor Tr1.

When the high-level control signal from the edge detector 101 is received, the transistor Tr1 is switched ON to establish connection between the clock run signal line 80 and the grounded line at the transistor Tr1. The clock run signal line 80 is set at low level (or inactive) at this time. As the clock run signal line 80 is set at low level, the power management controller 75 sets the PCI clock control signal (PCI STP) at high level in the same manner as the control process of FIG. 6 in the previous embodiment. As the PCI clock control signal (PCI STP) is set at high level, the clock generator 48 allows the supply of the PCI clock signal (PCI CLK2) to the devices 65, 66 and 67 of the interface block 42.

The PCI clock signal (PCI CLK2) from the clock generator 48 is also supplied to the pulse counter 102 of the control unit 100. The pulse counter 102 performs counting of the PCI clock signal (PCI CLK2) received from the clock generator 48. When an overflow of the pulse counter 102 takes place as a result of the clock counting, the pulse counter 102 outputs a high-level overflow signal to the AND gate 103.

At this time, the overflow signal output from the pulse counter 102 is set at high level, and the control signal output from the edge detector 101 is set at high level. The AND gate 103 outputs a high-level attach notice signal to the PCMCIA controller 69. The PCMCIA controller 69 generates an interrupt signal in response to the attach notice signal received from the AND gate 103, and outputs the interrupt signal to the interrupt signal line 82 at a given timing. The interrupt signal is delivered on the interrupt signal line 82 from the PCMCIA controller 69 to the south bridge 63.

In the present embodiment, when the PC card 81 is attached to the PC card connector 70, the PCI clock signal (PCI CLK2) is supplied from the clock generator 48 to both the PCMCIA controller 69 and the control unit 100, and thereafter the attach notice signal is supplied from the control unit 100 to the PCMCIA controller 69. Hence, the control unit 100 ensures that the PCMCIA controller 69 generates, in response to the attach notice signal, an interrupt signal and outputs the interrupt signal to the interrupt signal line 82 at the given timing based on the PCI clock signal (PCI CLK2).

Therefore, it is possible that the computer system 40 of the present embodiment effectively use the clock run function in order to provide the consumption power saving for the devices 65, 66 and 67 of the interface block 42 even when the serialized interrupt processing function of the PCMCIA controller 69 is active.

In the above-described embodiment, the supply of a card attach signal to the PCMCIA controller 69 is delayed by using the pulse counter 102 and the AND gate 103 within the control unit 100. Alternatively, in order to attain the objects and advantageous features of the present invention, the computer system may be configured to incorporate a delay device that delays the supply of a card attach signal to the PCMCIA controller 69, which will be described below.

Figure 12:
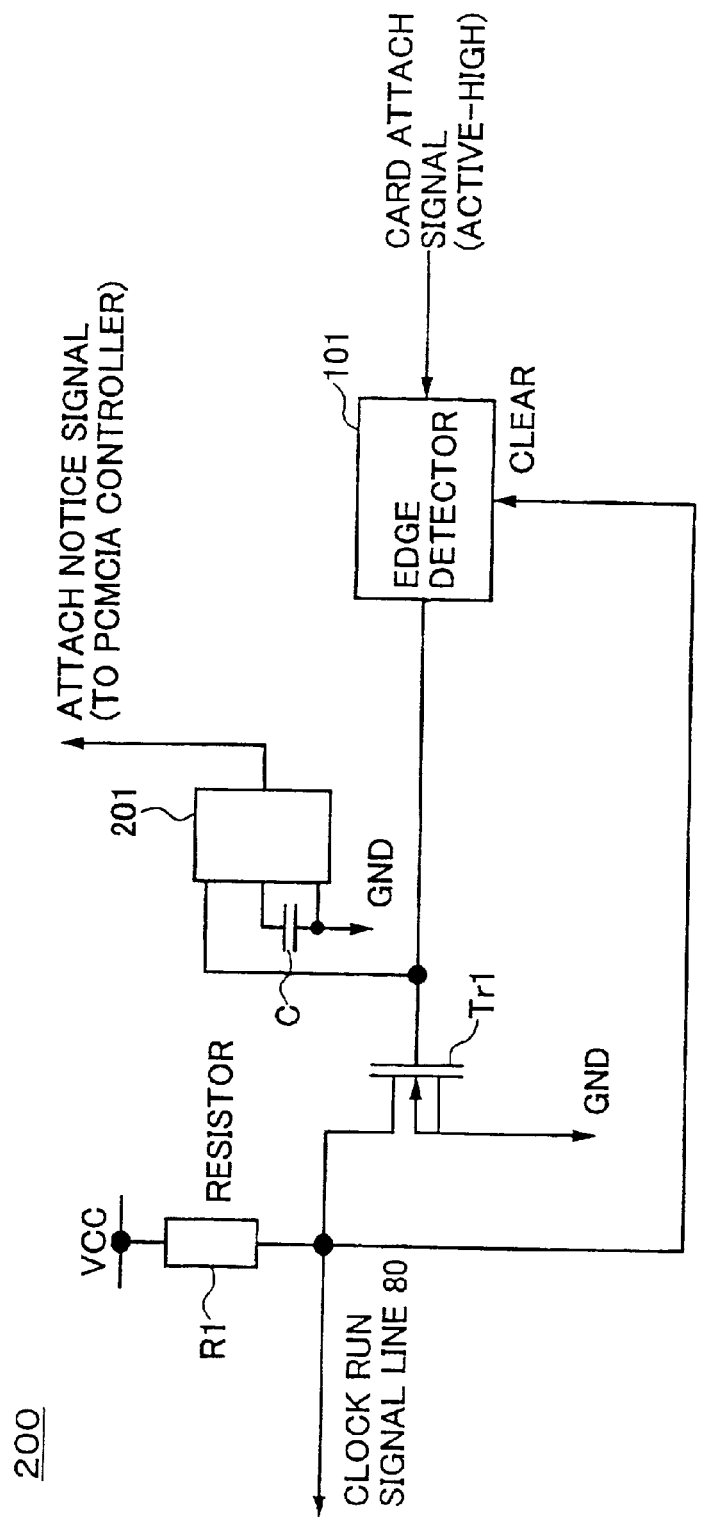
FIG. 12 is a block diagram of a variation of the control unit of the computer system of FIG. 9.

FIG. 12 shows a variation of the control unit of the computer system of FIG. 9. In FIG. 12, the elements which are essentially the same as corresponding elements in FIG. 11 are designated by the same reference numerals, and a description thereof will be omitted.

As shown in FIG. 12, the control unit 200 of the present embodiment is configured to include a delay device 201, instead of the pulse counter 102 and the AND gate 103 in the previous embodiment of FIG. 11.

The delay device 201 is comprised of a voltage detection circuit that has an input connected to the output of the edge detector 101 and an output connected to the PCMCIA controller 69. The card attach signal from the PC card connector 70 is supplied to the edge detector 101. The edge detector 101 detects whether the card attach signal is active-high. When it is detected that the card attach signal is active-high, the edge detector 101 outputs a high-level control signal to each of the delay device 201 and the transistor Tr1.

The voltage detection circuit of the delay device 201 compares a voltage of the control signal, output by the edge detector 101, with a reference voltage internally produced by the voltage detection circuit. When the control signal voltage is lower than the reference voltage, the voltage detection circuit outputs a low-level signal to the PCMCIA controller 69. When the control signal voltage is higher than the reference voltage, the voltage detection circuit outputs a high-level attach notice signal to the PCMCIA controller 69. In the delay device 201, the delay time to delay the supply of a card attach signal to the PCMCIA controller 69 may be adjusted by varying the capacitance of a capacitor C attached thereto.

In the present embodiment, when the PC card 81 is attached to the PC card connector 70, the PCI clock signal (PCI CLK2) is supplied from the clock generator 48 to both the PCMCIA controller 69 and the control unit 200, and thereafter the attach notice signal is supplied from the control unit 200 to the PCMCIA controller 69. Hence, the control unit 200 ensures that the PCMCIA controller 69 generates, in response to the attach notice signal, an interrupt signal and outputs the interrupt signal to the interrupt signal line 82 at the given timing based on the PCI clock signal (PCI CLK2).

Therefore, it is possible that the computer system 40 of the present embodiment effectively use the clock run function in order to provide the consumption power saving for the devices 65, 66 and 67 of the interface block 42 even when the serialized interrupt processing function of the PCMCIA controller 69 is active.

The control unit 100 and the control unit 200 in the second preferred embodiment are configured as an external circuit of the PCMCIA controller 69 in the configuration shown in FIG. 9.

Alternatively, the control units 100 and 200 may be built into either the PCMCIA controller 69 or the south bridge 63. The control unit 100 and the control unit 200 are configured by using the hardware in the second preferred embodiment. Alternatively, the functions of the control units 100 and 200 may be achieved by using the software that is executed by the PCMCIA controller 69.

Figure 13:
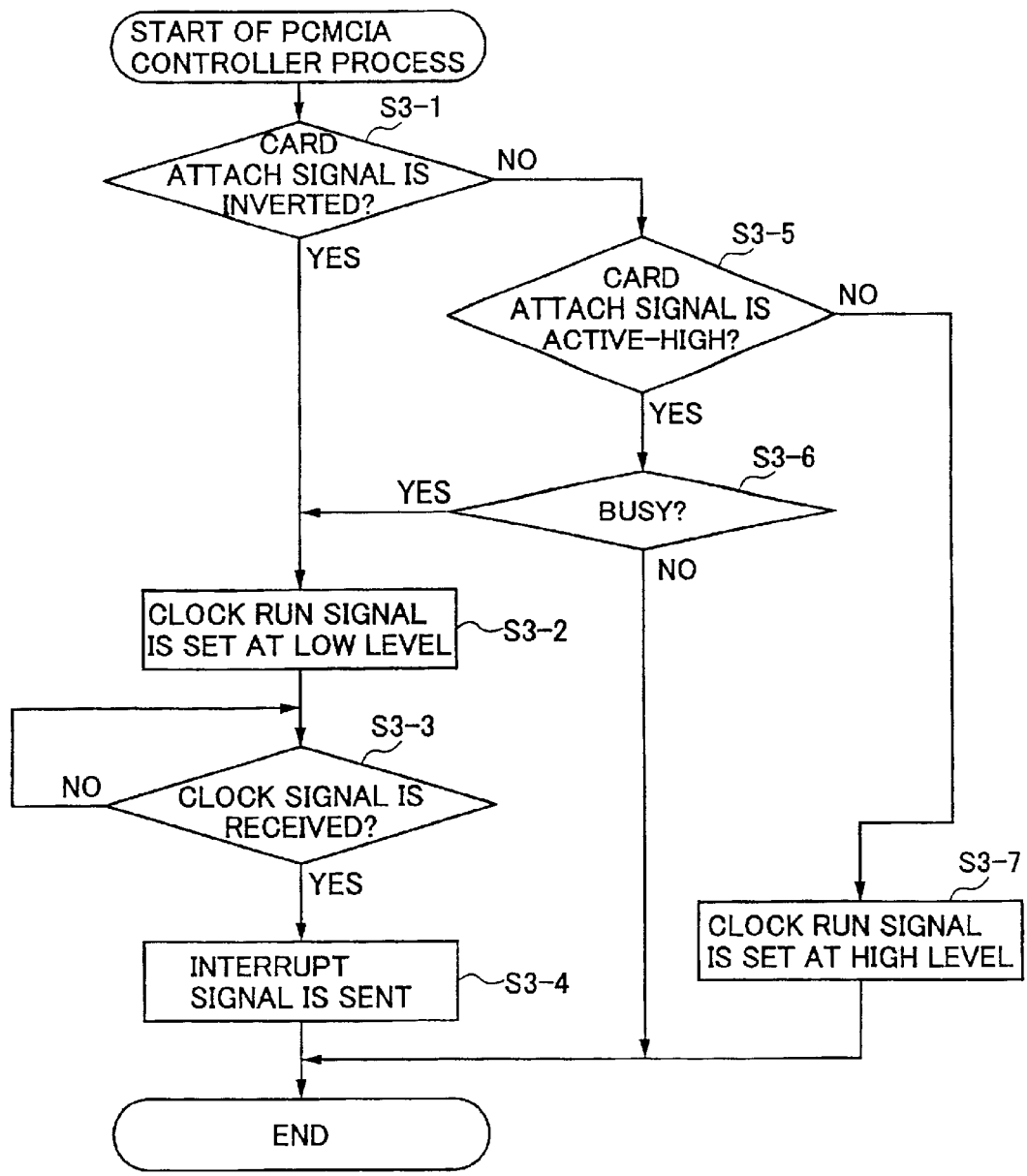
FIG. 13 is a flowchart for explaining an interrupt signal output process performed by a PCMCIA controller of the computer system to which a third preferred embodiment of the invention is applied.

FIG. 13 shows an interrupt signal output process that is performed by the PCMCIA controller of the computer system to which a third preferred embodiment of the invention is applied.

In the present embodiment, the computer system is configured in the same manner as the computer system of the previous embodiment shown in FIG. 4, except that the PCI clock signal (PCI CLK2) from the clock generator 48 is supplied to the PCMCIA controller 69.

In the following description, the elements which are essentially the same as corresponding elements in FIG. 4 are designated by the same reference numerals, and a description thereof will be omitted. Hereinafter, for the sake of simplicity of description, the PCMCIA controller 69 will be called the controller 69.

As shown in FIG. 13, at a start of the interrupt signal output process, the controller 69 at step S3-1 determines whether the card attach signal is inverted (that is, the signal is turned from high level to low level or vice versa) by the PC card connector 70. The card attach signal is set at high level when the PC card 81 is attached to the PC card connector 70, and, when the PC card 81 is detached from the PC card connector 70, the card attach signal is set at low level. The card attach signal is sent from the PC card connector 70 to the controller 69. In the step S3-1, it is determined whether the attachment of the PC card 81 to or the detachment of the PC 81 from the connector 70 takes place.

When the result at step S3-1 is affirmative (or when the card attach signal is inverted), the controller 69 at step S3-2 sets the clock run signal at low level so that the clock run signal line 80 is inactive or low.

Similar to the control process shown in FIG. 6, when the clock run signal line 80 is inactive or low, the power management controller 75 of the south bridge 63 sets the PCI clock control signal (PCI STP) at high level. When the PCI clock control signal (PCI STP) is set at high level, the clock generator 48 allows the supply of the PCI clock signal (PCI CLK2) to the devices 65, 66, 67 and 69 of the interface block 42.

After the step S3-2 is performed, the controller 69 at step S3-3 determines whether the PCI clock signal (PCI CLK2) from the clock generator 48 is received at the controller 69. The step S3-3 is repeated until the resulting answer is affirmative.

When the result at the step S3-3 is affirmative (or when the PCI clock signal (PCI CLK2) is received), the controller 69 at step S3-4 generates an interrupt signal of a specific pattern and outputs it to the interrupt signal line 82 at a given timing based on the PCI clock signal (PCI CLK2) received. The interrupt signal is delivered on the interrupt signal line 82 from the controller 69 to the PCI interface 71 of the south bridge 63. After the step S3-4 is performed, the process of FIG. 13 is finished.

Therefore, in the present embodiment, when the attachment of the PC card 81 to or the detachment of the PC 81 from the connector 70 takes place, the clock run function is negated, the PCI clock signal (PCI CLK2) from the clock generator 48 is supplied to the controller 69, and the controller 69 outputs the interrupt signal to the interrupt signal line 82.

On the other hand, when the result at step S3-1 is negative (or when the card attach signal is not inverted), the controller 69 at step S3-5 determines whether the card attach signal is active-high. In the step S3-5, it is determined whether the PC card 81 is attached to the PC card connector 70 or not.

When the result at the step S3-5 is affirmative (or when the PC card 81 is attached), the controller 69 at step S3-6 determines whether the PC card 81 is in a busy state. When the PC card 81 is in a busy state, the controller 69 performs the above steps S3-2 through S3-4. Namely, at this time, the clock run function is negated, the PCI clock signal (PCI CLK2) from the clock generator 48 is supplied to the controller 69, and the controller 69 outputs the interrupt signal to the interrupt signal line 82. When the PC card 81 is not in a busy state as the result of the step S3-6, the process of FIG. 13 is finished without performing the above steps S3-2 through S3-4.

Therefore, it is possible for the clock supply control apparatus of the present embodiment to control the execution of the clock run function in response to the operating condition of the PCMCIA controller 69.

When the result at the step S3-5 is negative (or when the PC card 81 is detached), the controller 69 at step S3-7 sets the clock run signal at high level so that the clock run signal line 80 is asserted. Similar to the control process shown in FIG. 6, when the clock run signal line 80 is active-high, the power management controller 75 of the south bridge 63 sets the PCI clock control signal (PCI STP) at low level. When the PCI clock control signal (PCI STP) is set at low level, the clock generator 48 inhibits the supply of the PCI clock signal (PCI CLK2) to the devices 65, 66, 67 and 69 of the interface block 42.

At this time, the process of FIG. 13 is finished without performing the above steps S3-2 through S3-4.

Therefore, it is possible that the computer system 40 of the present embodiment effectively use the clock run function in order to provide the consumption power saving for the devices 65, 66 and 67 of the interface block 42 even when the serialized interrupt processing function of the PCMCIA controller 69 is active.

The present invention is not limited to the above-described embodiments, and variations and modifications may be made without departing from the scope of the present invention.

Further, the present invention is based on Japanese priority application No. 2000-233482, filed on Aug. 1, 2000, the entire contents of which are hereby incorporated by reference.

What is claimed is:

1. A clock supply control apparatus which controls supply of a clock signal to first and second devices of a computer system, comprising:

a clock generating unit generating a clock signal;

a clock supply logic unit controlling supply of the clock signal from the clock generating unit to the second device in response to a clock control signal, the second device being operable with the clock signal supplied from the clock supply logic unit; and a controller setting the clock control signal at one of a clock supply inhibition level and a clock supply allowance level in response to a state of a clock run signal line, the resulting clock control signal being supplied from the controller to the clock supply logic unit, wherein the first device is operable with the clock signal from the clock generating unit and outputs an interrupt signal to an interrupt signal line regardless of whether the clock control signal is set at the clock supply inhibition level or the clock supply allowance level.

2. A clock supply control apparatus comprising:

a clock generating unit generating a clock signal;

a clock supply logic unit controlling supply of the clock signal from the clock generating unit to a device of a computer system in response to a clock control signal, the device outputting an interrupt signal in response to an operational signal based on the clock signal from the clock supply logic unit; and a control unit delaying supply of the operational signal to the device such that the device outputs the interrupt signal in response to the delayed operational signal after the clock signal from the clock supply logic unit is received at the device.

3. The clock supply control apparatus according to claim 2, wherein the device is provided with a card connecter and a card, the operational signal being supplied from the card connector to the device when the card is attached to the card connector, the device outputting the interrupt signal in response to the operational signal.

4. The clock supply control apparatus according to claim 3, wherein the control unit comprises:

a detector detecting whether the card is attached to the card connector; and a delay unit delaying the supply of the operational signal to the device such that the device outputs the interrupt signal in response to the delayed operational signal after the clock signal from the clock supply logic unit is received at the device.

5. The clock supply control apparatus according to claim 4, wherein the delay unit comprises:

a counter counting the clock signal from the clock supply logic unit; and a gate circuit outputting the delayed operational signal to the device in response to both an output signal of the counter and an output signal of the detector.

6. The clock supply control apparatus according to claim 4, wherein the delay unit comprises a voltage detection circuit that compares a voltage of an output signal of the detector with a reference voltage internally produced by the detection circuit in order to detect whether the card is attached to the card connector.

7. A clock supply control apparatus comprising:

a clock generating unit generating a clock signal;

a clock supply logic unit controlling supply of the clock signal from the clock generating unit to a device of a computer system in response to a clock control signal, the device being operable with the clock signal supplied from the clock supply logic unit, the device outputting an interrupt signal in response to an operational signal based on the clock signal from the clock supply logic unit; and a controller setting the clock control signal at one of a clock supply inhibition level and a clock supply allowance level in response to a state of a clock run signal line, the resulting clock control signal being supplied from the controller to the clock supply logic unit, wherein the controller detects whether the clock signal from the clock supply logic unit is received at the device, and the controller delays supply of the operational signal to the device such that the device outputs the interrupt signal in response to the delayed operational signal after it is detected that the clock signal from the clock supply logic unit is received at the device.

8. A clock supply control method which controls supply of a clock signal to first and second devices of a computer system, comprising the steps of:

generating a clock signal;

controlling supply of the clock signal from a clock supply logic unit to the second device in response to a clock control signal, the second device being operable with the clock signal supplied from the clock supply logic unit; and setting the clock control signal at one of a supply inhibition level and a supply allowance level in response to a state of a clock run signal line, the resulting clock control signal being supplied to the clock supply logic unit, wherein the first device is operable in accordance with the generated clock signal and outputs an interrupt signal to an interrupt signal line regardless of whether the clock control signal is set at the clock supply inhibition level or the clock supply allowance level.

9. A clock supply control method comprising the steps of:

generating a clock signal;

controlling supply of the clock signal to a device of a computer system by a clock supply logic unit in response to a clock control signal, the device outputting an interrupt signal in response to an operational signal based on the clock signal from the clock supply logic unit; and delaying supply of the operational signal to the device such that the device outputs the interrupt signal in response to the delayed operational signal after the clock signal from the clock supply logic unit is received at the device.

10. A clock supply control method comprising the steps of:

generating a clock signal;

controlling supply of the clock signal to a device of a computer system by a clock supply logic unit in response to a clock control signal, the device being operable with the clock signal supplied from the clock supply logic unit, the device outputting an interrupt signal in response to an operational signal based on the clock signal from the clock supply logic unit;

setting the clock control signal at one of a clock supply inhibition level and a clock supply allowance level in response to a state of a clock run signal line, the resulting clock control signal being supplied to the clock supply logic unit;

detecting whether the clock signal from the clock supply logic unit is received at the device; and delaying supply of the operational signal to the device such that the device outputs the interrupt signal in response to the delayed operational signal after it is detected that the clock signal from the clock supply logic unit is received at the device.

* * * * *